3,448,198
PHENYLCARBAMOYLETHYLTHIOPSEUDOUREAS
AS ANESTHETIC AGENTS
Bernard M. Regan, Chicago, Ill., assignor to Baxter Laboratories, Inc., Morton Grove, Ill., a corporation of Delaware
No Drawing. Continuation-in-part of application Ser. No. 639,618, May 19, 1967, which is a division of application Ser. No. 395,286, Sept. 9, 1964. This application Apr. 11, 1968, Ser. No. 720,450
Int. Cl. A61k 27/00
U.S. Cl. 424—324     10 Claims

ABSTRACT OF THE DISCLOSURE

A method of inducing local anesthesia by administering to animals a phenylcarbamoylethylthiopseudourea of the class shown in the second paragraph of the specification, for example, 2-(2'-phenylcarbamoylethylthio)-1-cyclohexylpseudourea.

---

This is a continuation-in-part of co-pending application Ser. No. 639,618, filed May 19, 1967, now abandoned. Application Ser. No. 639,618 is a division of application Ser. No. 395,286, filed Sept. 9, 1964, now abandoned.

The present invention relates to novel thiopseudoureas and in particular to the novel phenylcarbamoylethylthiopseudoureas having the general formula

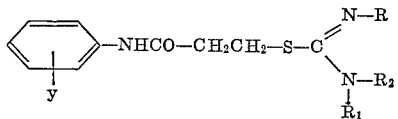

wherein $y$ is selected from the group consisting of —H, —CH$_3$ and —CF$_3$; R, R$_1$ and R$_2$ are each selected from the group consisting of —H, —CH$_2$CH=CH$_2$, lower alkyl having from 1 to 4 carbon atoms and cyclohexyl; and at least one of R, R$_1$ and R$_2$ are other than —H; and the pharmaceutically acceptable acid salts thereof.

The novel phenylcarbamoylethylthiopseudoureas of the present invention can be conveniently prepared by reacting a phenylcarbamoylethyl halide with an appropriate thiourea to form the hydrohalic acid salt. For example, phenylcarbamoylethyl chloride [1] can be reacted with an alkyl thiourea to form a phenylcarbamoylethylthiopseudourea hydrogen chloride salt. The free base form of the phenylcarbamoylethylthiopseudourea can then be prepared by reacting the salt with an alkaline reagent, for example, sodium carbonate, sodium hydroxide, aqueous ammonia, and other such alkaline reagents commonly employed for converting salts to free bases. The free base can be converted, in turn, to the salt form of the compound by reaction with a pharmaceutically acceptable acid, for example, sulfuric, phosphoric, nitric, hydrochloric, hydriodic, hydrobromic, acetic, citric, tartaric, lactic, malic, fumaric, succinic, ascorbic, pyruvic and the like inorganic and organic acids known to be pharmaceutically acceptable.

In a preferred method of the present invention, a mixture of a phenylcarbamoylethyl chloride (0.1 mole), an appropriate thiourea (0.1 mole) and ethanol (100 ml.) is heated to boiling (ca. 80° C.) and refluxed for about 8 to about 24 hours. The excess solvent is removed by distillation and the residue is usually distributed between water and a water-immiscible solvent, preferably ethyl acetate, to remove by-products. The aqueous portion is then concentrated in vacuo to obtain substantially pure salts of the phenylcarbamoylethylthiopseudoureas. If it is desired, the compounds can be crystallized from acetone or from mixtures of ethyl acetate and methanol or ethanol for further purification.

Examples of phenylcarbamoylethyl chlorides which can be used for the preparation of the novel thiopseudoureas of the present invention are compounds having the general formula

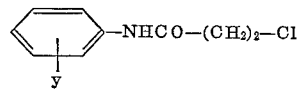

wherein $y$ is selected from the group consisting of —H, —CH$_3$ and —CF$_3$.

Examples of thioureas which can be used for the preparation of the novel thiopseudoureas of the present invention are compounds having the general formula

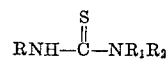

wherein R, R$_1$ and R$_2$ are each selected from the group consisting of —H, —CH$_2$CH=CH$_2$, lower alkyl having from 1 to 4 carbon atoms and cyclohexyl; and at least one of R, R$_1$ and R$_2$ are other than —H.

Preferred compounds of the present invention are those in which the phenylcarbamoylethyl moiety is selected from the group consisting of:

phenylcarbamoylethyl,
o-methylphenylcarbamoylethyl, and
o-trifluoromethylphenylcarbamoylethyl.

Also preferred are those compounds in which the pseudourea moiety is selected from the group consisting of:

1-n-butyl pseudourea,
1-cyclohexyl pseudourea,
1,1-diethyl pseudourea,
1,1-diallyl pseudourea,
1,3-diethyl pseudourea,
1,3-diisopropyl pseudourea, and
1-cyclohexyl-3-methyl pseudourea.

Although preferred phenylcarbamoylethylthiopseudoureas and specific methods of their preparation are described herein, it will be understood that the invention is not limited to these preferred compounds or these specific methods of preparation.

The novel phenylcarbamoylethylthiopseudoureas of the present invention are effective and useful agents for inducing local anesthesia in animals. They are more active topically on guinea pig cornea and intradermally in guinea pig wheals and have better margins of safety than the current drug of choice, lidocaine hydrochloride, as determined in direct, side-by-side comparisons with that drug.

The novel phenylcarbamoylethylthiopseudoureas of the present invention can be used as local anesthetic agents in the free base form or in the form of pharmaceutically acceptable acid salts of the free bases. For convenience in administration in aqueous solution, it is preferable to use the salt form of the compounds. The free base form is preferable when it is desired to use the compound in oleaginous pharmaceutical diluents. The novel compounds of the present invention can be conveniently administered in the form of ointments, salves, aerosol sprays, solutions and the like. The effective amount of anesthetic agent to be administered will, of course, depend upon many variable factors such as, for example, the size of the local area to be anesthetized, the length of time anesthesia is desired, the nature of the treatment requiring local anesthesia, the physical condition of the subject undergoing treatment and other such factors. It will be understood that the method of the present invention includes any and all such variations in administering effective amounts

---

[1] Also named β-chloropropionanilide; for preparation, see F. Mayer et al., Ber. 60 B 858 (1927).

of the local anesthetic agents of the present invention as would be apparent to those skilled in the art and is not limited to the illustrative embodiments of the invention specifically described herein.

The practice of the present invention is further illustrated by reference to the following examples in which all "parts" and "percentages" are "parts" and "percentages" by weight unless otherwise indicated.

Example I (a) Phenylcarbamoylethyl chloride (9.2 grams, 0.55 mole), 1-cyclohexyl-2-thiourea (7.9 grams, 0.05 mole) and ethanol (100 ml.) were refluxed overnight. The reaction mixture was concentrated and crystals formed on cooling. Ethyl acetate was added and the product was collected by filtration and recrystallized from ethanol-ethyl acetate to give 2-(2'-phenylcarbamoylethylthio)-1-cyclohexylpseudourea hydrochloride (I) of M.P. 167–8° C. in a 9.9 gram yield (58% of theory).

(b) The above hydrochloride salt of 2-(2'-phenylcarbamoylethylthio)-1-cyclohexylpseudourea was converted to the free base form of the compound by reaction with sodium carbonate as follows:

A solution of 1-cyclohexyl-2-(2'-phenylcarbamoylethylthio)-pseudourea hydrochloride (1.00 gram, 2.92 millimoles) in water (100 ml.) was cooled in an ice-water bath and stirred as a solution of sodium carbonate (0.312 gram, 2.92 millimoles) in water (25 ml.) was added dropwise during 30 minutes. The free base precipitated as a white solid which was collected by filtration, washed with water, air dried for two hours, and then dried over potassium hydroxide under vacuum. The dried base (0.7 gram, M.P. 108–9° C.) was filtered and then cooled under tap water and soon crystallization occurred. The crystalline 1-cyclohexyl-2-(2'-phenylcarbamoylethylthio)-pseudourea was collected and vacuum dried over potassium hydroxide at 65° C. to give 0.5 gram, M.P. 101° C.

Analysis.—Calculated for $C_{16}H_{23}N_3OS$: C, 62.92%; H, 7.59%; N, 13.75%; S, 10.49%. Found: C, 63.20%; H, 7.49%; N, 13.65%; S, 10.59%.

Example II

A solution of o-trifluoromethylphenylcarbamoylethyl chloride (12.6 grams, 0.05 mole) and 1-cyclohexyl-2-thiourea (7.9 grams, 0.05 mole) in ethanol was refluxed overnight and then concentrated to an oily residue which did not crystallize on standing. The oily product was distributed between ethyl acetate and water. The aqueous layer was reextracted with ethyl acetate and with ether. Concentration in vacuo of the water solution gave an amorphous residue which dissolved in acetone and crystallized on standing. The 2-[2'-(o-trifluoromethylphenylcarbamoyl)-ethylthio]-1-cyclohexylpseudourea hydrochloride (II) was recrystallized from acetone to give 6.1 grams (30% of theory), M.P. 152–5° C.

Example III

A mixture of o-methylphenylcarbamoylethyl chloride (13.8 grams, 0.07 mole) 1-n-butyl-2-thiourea (9.3 grams, 0.07 mole) and ethanol (150 ml.) was heated to boiling and refluxed overnight. The reaction product was concentrated to dryness and the amorphous residue was distributed between ethyl acetate and water. The aqueous layer was reextracted with ethyl acetate and with ether and then concentrated in vacuo to dryness. The amorphous residue dissolved in hot acetone and crystallized on cooling. The 2-[2'-(o-methylphenylcarbamoyl)-ethylthio]-1-n-butyl-pseudourea hydrochloride (III) was recrystallized from acetone which yielded 13.8 grams (60% of theory), M.P. 101–10° C.

Analysis.—Calculated for $C_{15}H_{24}ClN_3OS$: C, 54.61%; H, 7.33%; N, 12.74%. Found: C, 54.60%; H, 7.16%; N, 12.48%.

Example IV

A solution of phenylcarbamoylethyl chloride (9.2 grams, 0.05 mole) and 1,1-diallyl-2-thiourea (7.8 grams, 0.05 mole) in methanol (50 ml.) was refluxed for eight hours. The reaction mixture was concentrated and the concentrate diluted with acetone and ethyl acetate to effect crystallization. The crystalline product was recrystallized from methanol-ethyl acetate, and 2-(2'-phenylcarbamoylethylthio)-3,3-diallylpseudourea hydrochloride (IV) of M.P. 137–8° C. was isolated in a 7.5 gram yield (44% of theory).

Employing the methods described in the above examples the following compounds were likewise prepared.

2-[2'-(o-methylphenylcarbamoyl)-ethylthio] - 1 - cyclohexylpseudourea hydrochloride (V)

2-(2'-phenylcarbamoylethylthio) - 1,3 - diisopropylpseudourea hydrochloride (VI)

2 - (2' - phenylcarbamoylethylthio) - 1 - cyclohexyl-3-methylpseudourea hydrochloride (VII)

2 - (2' - phenylcarbamoylethylthio) - 3,3 - diethylpseudourea hydrochloride (VIII)

The above eight compounds (I to VIII) were tested for local anesthetic activity on guinea pig cornea using a modified Chance and Lobstein [1] method and intradermally (I.D.) in guinea pig wheals using a modified Bulbring and Wajda [2] method to determine the effective concentrations ($EC_{50}$). The lethal doses were determined by intravenous (I.V.) injection in white mice ($LD_{50}$). Relative activity and relative toxicity values were calculated by reference to lidocaine hydrochloride as a standard, whose activity and toxicity are both by definition, unity. Thus, a compound is characterized by its relative anesthetic activity, RA, its relative toxicity, RT, and the ratio RA/RT, or anesthetic index, AI. These values are given in the following table.

As can be seen from the table, compounds I–VIII are all more active topically (RA corneal 6.4, 5.6, 4.5, 5.0, 4.7, 5.0, 7.5 and 2.4 respectively) and intradermally (RA I.D. 1.9, 1.6, 1.5, 1.9, 2.4, 2.8, 5.7 and 1.2 respectively) than lidocaine hydrochloride (RA corneal and I.D. 1.0). Moreover, compounds I, III, V and VIII are also less

TABLE

| Compound | $EC_{50}$ [1] (mg./ml.) | | RA | | $LD_{50}$ [2] Mg./kg. I.V. | RT I.V. | AI=RA/RT | |
|---|---|---|---|---|---|---|---|---|
| | Corneal | I.D. | Corneal | I.D. | | | Corneal | I.D. |
| Lidocaine HCl | 9.5 | 5.74 | 1.0 | 1.0 | 32 | 1.0 | 1.0 | 1.0 |
| I | 1.4 | 0.38 | 6.4 | 1.9 | 55 | 0.58 | 11 | 3.3 |
| II | 1.6 | 0.46 | 5.6 | 1.6 | 27 | 1.2 | 4.7 | 1.3 |
| III | 2.0 | 0.49 | 4.5 | 1.5 | 43 | 0.74 | 6.1 | 2.0 |
| IV | 1.8 | 0.39 | 5.0 | 1.9 | 33 | 0.97 | 5.2 | 2.0 |
| V | 1.9 | 0.31 | 4.7 | 2.4 | 38 | 0.84 | 5.6 | 2.9 |
| VI | 1.8 | 0.26 | 5.0 | 2.8 | 20 | 1.6 | 3.1 | 1.8 |
| VII | 1.2 | 0.13 | 7.5 | 5.7 | 25 | 1.3 | 5.8 | 4.4 |
| VIII | 3.8 | 0.62 | 2.4 | 1.2 | 47 | 0.68 | 3.5 | 1.8 |

[1] Effective concentration which anesthetized 50% of the test animals.
[2] Lethal dose which killed 50% of the test animals.

---
[1] Chance and Lobstein, J. Pharmacol. and Exper. Therap. 82, 203 (1944).

[2] Bulbring and Wajda, ibid. 85, 78 (1945).

toxic (RT 0.58, 0.74, 0.84 and 0.68 respectively) than lidocaine hydrochloride (RT 1.0) by the intraveneous route, while compound IV is about equitoxic (RT 0.97). On the other hand, compounds II, VI and VII are more toxic (RT 1.2, 1.6 and 1.3) than lidocaine hydrochloride intravenously. However, all eight compounds have superior anesthetic indicies (RA/RT), topically and intradermally, then lidocaine hydrochloride (AI corneal and I.D. 1.0). The AI corneal values for compounds I–VIII are 11, 4.7, 6.1, 5.2, 5.6, 3.1, 5.8 and 3.5 respectively and the AI I.D. values are 3.3, 1.3, 2.0, 2.0, 2.9, 1.8, 4.4 and 1.8 respectively. Consequently, compounds I–VIII have a greater margin of safety in addition to being more potent than lidocaine hydrochloride. From the foregoing table it is seen that the novel compounds of the present invention more closely approach the ideal local anesthetic agent than any of the compounds previously known.

What is claimed is:
1. The method of inducing local anesthesia in an animal which comprises administering to said animal an effective amount of a compound selected from the group consisting of phenylcarbamoylethylthiopseudoureas having the formula:

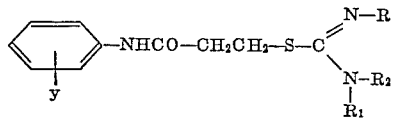

wherein $y$ is selected from the group consisting of —H, —$CH_3$ and —$CF_3$; R, $R_1$ and $R_2$ are each selected from the group consisting of —H, —$CH_2CH=CH_2$, lower alkyl having from 1 to 4 carbon atoms and cyclohexyl; and at least one of R, $R_1$ and $R_2$ are other than —H; and the pharmaceutically acceptable acid salts thereof.

2. The method of claim 1 in which the phenylcarbamoylethylthiopseudourea is 2-(2'-phenylcarbamoylethylthio)-1-cyclohexylpseudourea.

3. The method of claim 1 in which the phenylcarbamoylethylthiopseudourea is 2-(2'-phenylcarbamoylethylthio)-1-cyclohexylpseudourea hydrochloride.

4. The method of claim 1 in which the phenylcarbamoylethylthiopseudourea is 2-[2'-(o-trifluoromethylphenylcarbamoyl)-ethylthio]-1-cyclohexylpseudourea hydrochloride.

5. The method of claim 1 in which the phenylcarbamoylethylthiopseudourea is 2-[2'-(o-methylphenylcarbamoyl)-ethylthio] - 1 - n-butyl-cyclohexylpseudourea hydrochloride.

6. The method of claim 1 in which the phenylcarbamoylethylthiopseudourea is 2-(2'-phenylcarbamoylethylthio)-3,3-diallylpseudourea hydrochloride.

7. The method of claim 1 in which the phenycarbamoylethylthiopseudourea is 2-[2'-(o - methylphenylcarbamoyl)-ethylthio]-1-cyclohexylpseudourea hydrochloride.

8. The method of claim 1 in which the phenylcarbamoylethylthiopseudourea is 2-(2'-phenylcarbamoylethylthio)-1,3-diisopropylpseudourea hydrochloride.

9. The method of claim 1 in which the phenycarbamoylethylthiopseudourea is 2-(2'-phenylcarbamoylethylthio)-1-cyclohexyl-3-methylpseudourea hydrochloride.

10. The method of claim 1 in which the phenylcarbamoylethylthiopseudourea is 2-(2'-phenylcarbamoylethylthio)-3,3-diethylpseudourea hydrochloride.

References Cited

Bauer et al.: Jour. Org. Chem. vol. 26, pp. 1443–5 (1961).

Weiss et al.: Jour. Amer. Chem. Soc., vol. 72, pp. 1687–9 (1950).

ALBERT T. MEYERS, *Primary Examiner.*

J. D. GOLDBERG, *Assistant Examiner.*